June 6, 1961 R. VOGT 2,987,272
AIRCRAFT WITH A TILTABLE ROTOR SYSTEM
Filed April 29, 1959 2 Sheets-Sheet 1

INVENTOR.
RICHARD VOGT
BY
ATTORNEY

June 6, 1961  R. VOGT  2,987,272
AIRCRAFT WITH A TILTABLE ROTOR SYSTEM
Filed April 29, 1959  2 Sheets-Sheet 2

INVENTOR.
RICHARD VOGT
BY *Ralph B. Pasternja*
ATTONEY.

United States Patent Office 2,987,272
Patented June 6, 1961

2,987,272
AIRCRAFT WITH A TILTABLE ROTOR SYSTEM
Richard Vogt, Santa Barbara, Calif., assignor to Curtiss-Wright Corporation, a corporation of Delaware
Filed Apr. 29, 1959, Ser. No. 809,739
3 Claims. (Cl. 244—17.23)

This invention relates generally to vertical take off aircraft and more particularly to a novel aerial platform type of craft capable of hovering for extended periods or moving in any desired direction.

Many different types of aerial platforms have been proposed for reconnaissance purposes. Generally, these structures comprise a basic fuselage or "platform" and two or more rotors for providing vertical lifting forces. Forward flight is usually achieved by simply tilting the vehicles the required amount to provide a horizontal thrust component from the same rotors employed for lifting, As is known to those skilled in the art, the lift over drag ratio for these types of vehicles is very low which means that the drag is very high in relation to lift. Accordingly, in order to produce the relatively large forward thrust from the rotors, the vehicle has to be tilted forwardly to a rather large angle. As an example, if the lift over drag ratio is of the order of two, a tilt angle of thirty degrees is required.

Tilt angles or inclinations of this order are very undesirable. Not only is it uncomfortable for the pilot to fly the craft in such position, but any carried load has to be securely tied down to the craft. In addition, with the main portions of the craft tilted forwardly, the drag is greatly increased which necessitates an increased forward thrust component in turn reducing the vertical lifting component of the rotors.

Another undesirable characteristic of flying platform type of vehicles results from vibration problems. It is difficult to design a cantilevered structure for supporting the rotors which structure has a higher natural frequency than the rotor rotation frequency. As a consequence it has heretofore been necessary to employ additional bracing to cantilevered structures to avoid failure from possible resonant conditions.

In addition to the foregoing, the principal weight of the type of prior art vehicles under consideration is concentrated centrally with the weight of the pilot. The natural frequency of the entire vehicle is therefore relatively high and generally will exceed the response time of the pilot. Such vehicles are therefore difficult to fly in the absence of some type of gyro-stabilizer.

With the foregoing in mind, it is a primary object of the present invention to provide a novel aerial platform type of construction which overcomes the foregoing difficulties.

More particularly, an object is to provide a vehicle in which the fuselage portion of the craft in which the pilot is seated may be maintained level whether hovering or in forward flight.

Another important object is to provide a vehicle in which the natural frequency of cantilevered structural portions thereof is low compared to the rotor-rotation frequency to the end that possible mechanical resonant conditions are avoided.

Similarly, it is an object to provide a flying platform vehicle in which the natural frequency of the entire vehicle in roll and pitch is low compared to the pilot's response time whereby such craft may be flown with maximum safety and without the necessity of auto-pilots, gyro-stabilizers, and the like.

Further objects of the invention are to provide an aircraft meeting the foregoing objects which is extremely rugged and simple in construction, to the end that minimum maintenance is required.

These and other objects of the invention are attained, briefly, by making the entire lift producing system which includes the engines, gears, drive shafts, and rotors as a single unit, tiltable with respect to the fuselage body, the latter structure carrying the crew and payload. This lift producing mechanism including, engines, fuel tanks, and the major portion of the gearing is disposed at the ends of a long slender tubular spar projecting from each side of the central fuselage. By this arrangement, the natural frequency of the cantilevering spar is low compared to rotor frequency. Moreover, the natural frequency of the entire vehicle is similarly reduced.

A better understanding of the preferred embodiment of the invention will be had by referring to the accompanying drawings, in which.

Figure 1:
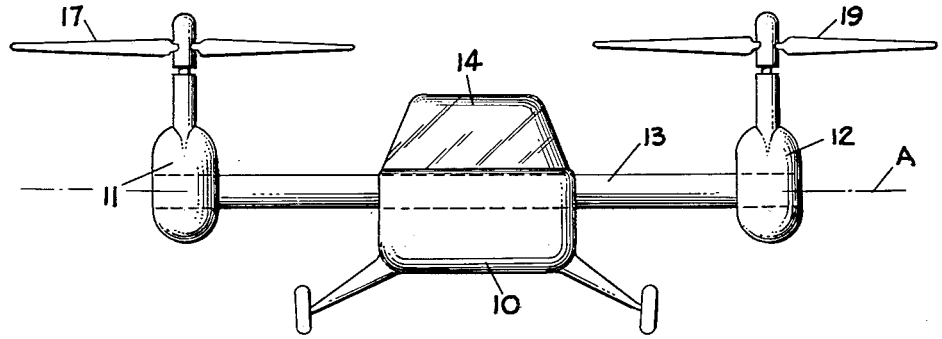
FIGURE 1 is a front elevational view of the aerial platform of this invention.

Referring first to FIGURE 1, there is shown an aircraft fuselage body 10 with engine nacelles 11 and 12 laterally disposed on opposite sides of the body. As shown, these nacelles are tiltably secured to the fuselage 10 as by a support member 13 preferably in the form of a tubular spar. The arrangement is such that the nacelles 11 and 12 may be tilted simultaneously in a fore and aft plane about a horizontal axis A—A.

Figure 2:
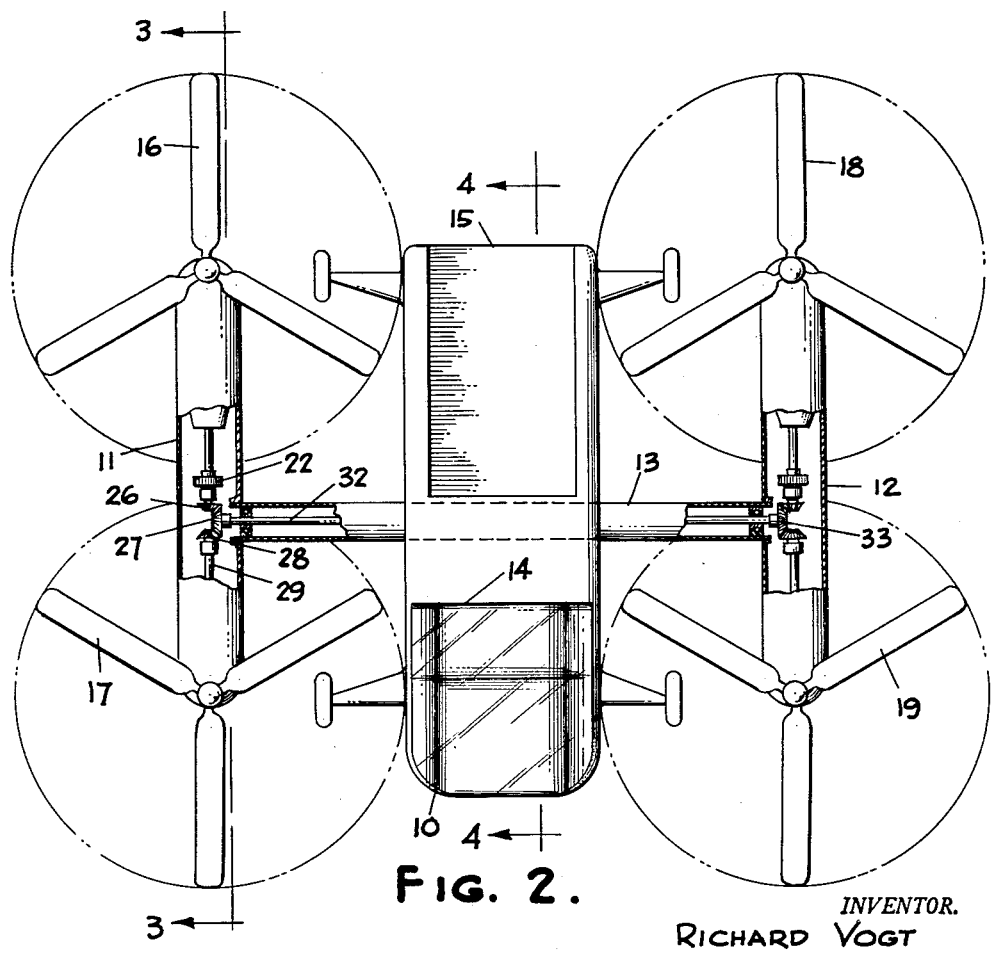
FIGURE 2 is a plan view thereof.

With particular reference to FIGURE 2, it will be noted that the fuselage body 10 includes a forward pilot's compartment 14 and a relatively large flat payload area 15. The engine nacelles 11 and 12, on the other hand, each include two rotors disposed aft and forward of the horizontal tilt axis A—A as indicated at 16 and 17 for the nacelle 11 and 18 and 19 for the nacelle 12. These rotors are normally horizontal to provide a vertical lifting force for the craft.

The mechanism within the nacelles 11 and 12 for driving the pairs of rotors is identical and description of one will, therefore, suffice for both. Referring to the nacelle 11 as shown in detail in FIGURE 3, there is provided an engine 20 including a driving gear 21 coupled to a driven gear 22 on a horizontal shaft 23 extending in a fore and aft direction. The aft or rear end of the shaft 23 terminates in bevel gears 24 in turn connected to a vertical shaft 25 for driving the rotor 16. The forward end of the shaft 23 in front of the driven gear 22 terminates in a bevel gear 26 coupled through a cross-over shaft gear 27 to a second bevel gear 28 as shown most clearly in FIGURE 2. The bevel gear 28 in turn is secured to the end of a second horizontal shaft 29 extending in a fore and aft direction. The forward end of the shaft 29 terminates in bevel gears 30 connected to a second vertical shaft 31 for the rotor 17.

By the foregoing arrangement, rotation of the driven gear 22 will rotate the shaft 23 and propeller 16 through the medium of the bevel gears 24 and vertical shaft 25. In addition, rotation of this driven gear 22 will rotate the bevel gears 26, 27, and 28 to rotate the shaft 29 through the medium of the bevel gears 30 and vertical shaft 31 to rotate the rotor 17.

As shown best in FIGURE 2, similar gearing is provided for the nacelle 12 and in the embodiment chosen for illustrative purposes, the cross over end gear 27 serves to couple the operation of the engine 20 in the nacelle 11 with the corresponding engine in the nacelle 12 through a cross over shaft 32 running through the hollow tubular spar 13 and terminating in a second end gear 33. By this arrangement, the two engines are mechanically connected together so that in the event one should fail, the other engine will insure that all four rotors will continue to operate. While this cross over connection in the form of an inner shaft 32 is shown as included within the tubular spar 13, it could be exterior thereof and disposed in a different position, the only requirement being that the engines be interconnected in some manner. Since in normal operations both engines will be functioning in a substantially identical manner, there will be negligible load on the end gears 27 and 33 and on the cross over shaft 32. Therefore, the end gears 27 and 33 essentially function as idler gears to interconnect the driving bevel gears for the respective fore and aft shafts.

Figure 4:
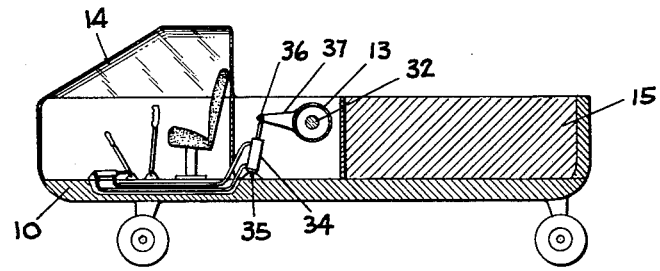
FIGURE 4 is another partial cross section of the fuselage taken in the direction of the arrows 4—4 of FIGURE 2.

Referring now to FIGURE 4, it will be noted that the tubular spar 13 passes transversely through the fuselage and is mounted therein for rotation or tiltable movement about the axis A—A. In order that orientation of the fuselage 10 with respect to the engine nacelles may be effected by the pilot within the compartment 14, a suitable means is provided for adjustably rotating this member with respect to the fuselage. This means may be manual, electric, hydraulic, or any equivalent system. In the embodiment chosen for illustrative purposes, the means includes a simple hydraulic cylinder and piston 34 secured at its lower end to the fuselage as at 35 and at its upper end pivoted at 36 to the end of a lever arm 37 rigidly secured to the tubular spar 13. By this arrangement, the pilot need simply pump fluid into the cylinder 34 to expand or retract the piston rod and thus cause the entire fuselage 10 to rotate with respect to the tubular spar in a counter clockwise or clockwise direction.

Control of the aircraft in roll and pitch is normally effected by changing the pitch angles of the individual rotors 16, 17, 18, and 19. In other words, the effective thrust of each of the rotors can be varied over a wide range by simply changing the pitch of the rotors while maintaining them rotating at a constant speed. The mechanism for altering the pitch of rotor blades is so well known in the art that such a system among the various available has not been illustrated in order to avoid obscuring the drawings. It will be readily understood to those skilled in the art, however, that the desired degree of stability and control can be achieved in the foregoing manner.

Figure 3:
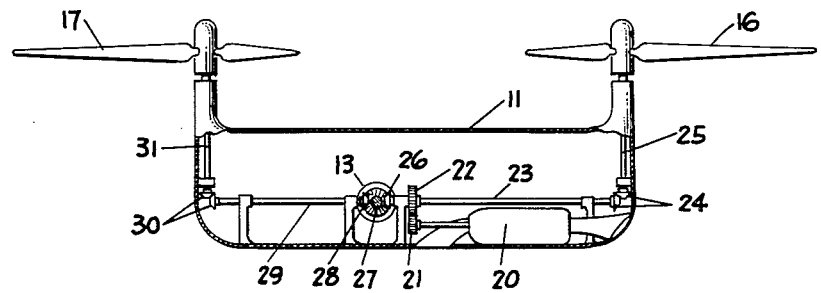
FIGURE 3 is a partial cross section taken in the direction of the arrows 3—3 of FIGURE 2 showing one of the engine nacelles.
Figure 5:
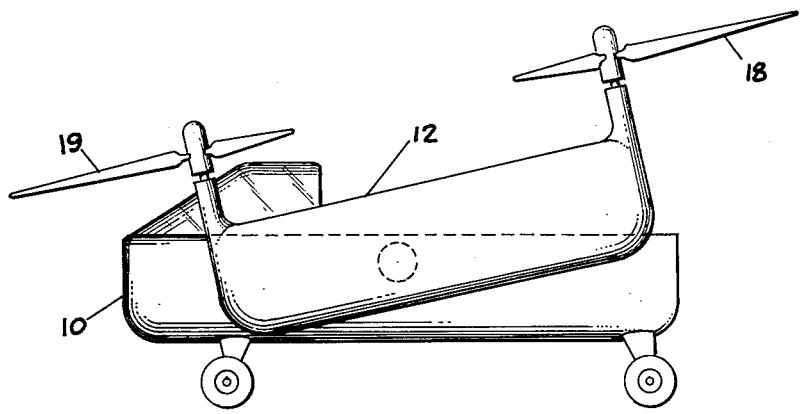
FIGURE 5 is a side elevational view illustrating the relative positions of the engine nacelles and fuselage during forward flight.

In the operation of the aircraft as described, the rotors are intially in a horizontal position as illustrated in FIGURES 1 and 3 and starting of the engines will result in vertical lifting forces to raise the central fuselage body 10. When it is desired to effect forward flight, the pitch angle on the rear rotors 16 and 18 is altered to increase the vertical thrust and thus cause the engine nacelles to tilt forwardly. Since these engine nacelles are connected to the fuselage body 10 through the tubular spar 13 and hydraulic cylinder 34, the fuselage body 10 will tend to tilt simultaneously with the nacelles. In order to maintain the fuselage body 10 level, the pilot simply pumps the hydraulic cylinder 34 to retract the piston within the cylinder thus pulling on the end of the lever 37 which will cause the fuselage 10 to rotate in a clockwise direction with respect to the tubular spar and thus bring it to a level position as illustrated in FIGURE 5. In connection with this operation, it is important to understand that the torque provided for tilting the spar is derived from the rotors themselves as a consequence of the change in thrust characteristics of the rear rotors with respect to the front rotors. Therefore, there is no reaction torque applied to the fuselage 10 and the fuselage 10 may be readily positioned at any desired inclination with respect to the position of the rotors and engine nacelles.

With the aircraft flying in an attitude as illustrated in FIGURE 5, it will be evident that the payload and pilot may be maintained in a relatively level position to the added comfort of the pilot. In addition, in such position the drag is considerably reduced over the drag that would exist were the fuselage 10 tilted at the same angle as the engine nacelles. Therefore, better flight characteristics are realizable by means of the present invention.

In addition, it will be evident from the foregoing description that the major masses of the vehicle are concentrated in the nacelles which in turn are cantilevered from the fuselage by the tubular spar. As a consequence the natural frequency of this supporting structure is low compared to the rotor frequency and, therefore, resonant conditions are avoided and expensive and bulky reinforcing is unnecessary.

Similarly, laterally displacing the major masses reduces the overall frequency of the entire vehicle to a period well within the response time of the pilot to the end that flying of the vehicle is greatly facilitated.

While a preferred embodiment of the invention has been shown, it is to be understood that many variations and modifications that fall clearly within the scope and spirit of the invention will readily occur to those skilled in the art. The aerial platform with a tiltable rotor system and displaced masses is, therefore, not to be thought of as limited to the particular embodiment set forth for illustrative purposes.

What is claimed is:

1. An aircraft comprising, in combination: a central fuselage; an elongated tubular support member passing transversely of said fuselage along a horizontal axis and terminating in opposite ends in engine nacelles; adjustable means securing the central portion of said support member to said fuselage so that the oppositely extending end portions of said support member cantilever said engine nacelles to said fuselage at equally spaced lateral distances, each of said engine nacelles having two coplanar rotors spaced fore and aft of said horizontal axis and an engine coupled to rotate said two rotors, whereby both roll and pitch control of said aircraft is realizable by individually controlling the pitch angles of said rotors, said adjustable means including means for rotating said support member about said horizontal axis whereby said fuselage may be tilted about said horizontal axis with respect to said support member to maintain said fuselage substantially level when the thrust direction of said rotors is changed to provide a horizontal thrust component for forward flight.

2. An aircraft according to claim 1, including a crossover shaft within said tubular support member interconnecting the engine in one of said nacelles with the engine in the other of said nacelles.

3. An aircraft according to claim 1, in which said lateral distances at which said nacelles are cantilevered and the total mass of each of said nacelles, and engine therein is such that the natural vibration frequency of the resulting cantilevered structure is substantially less than the frequency of rotation of said rotors.

References Cited in the file of this patent

UNITED STATES PATENTS

| 2,445,446 | Mas | July 20, 1948 |
| 2,501,227 | Lewis | Mar. 21, 1950 |
| 2,708,081 | Dobson | May 10, 1955 |